Reed C. Lawlor
Inventor

Reed C. Lawlor
Inventor

Reed C. Lawlor
Inventor

Reed C. Lawlor
Inventor

United States Patent Office
3,186,111
Patented June 1, 1965

3,186,111

"PEEK-A-BOO" RETRIEVAL SYSTEM

Reed C. Lawlor, San Marino, Calif.
(412 W. 6th St., Los Angeles 14, Calif.)

Filed Dec. 6, 1961, Ser. No. 157,409
17 Claims. (Cl. 35—17)

This patent application relates to an improved indexing system employing "peak-a-boo" cards.

In this invention semi-transparent peek-a-boo cards that have visual light transmitting qualities are employed. A set of such cards facilitates the recognition of data of different degrees of relevancy to a subject under consideration.

Inasmuch as the invention is particularly applicable to the indexing of medical information, it is described with particular reference thereto. However, as will be pointed out specifically hereinafter, the invention is also applicable to the indexing of other kinds of information.

In the field of medicine, numerous symptoms are generally associated with each of a large number of diseases and a large number of diseases are associated with each symptom. The association may be of various kinds. Some symptoms occur very frequently or almost invariably when a particular disease is present. Some symptoms occur very infrequently or rarely when a particular disease is present. A symptom of the first kind, namely, one of those which occurs very frequently, if a specific disease is present, indicates strongly the presence of that disease if the symptom is present, especially if the symptom occurs infrequently or not at all with other diseases. A symptom of the second kind, namely, one of those that rarely occur, if a specific disease is present, indicates strongly the absence of that disease, if the symptom is present, especially if it occurs frequently with other diseases.

A symptom that is strongly associated with one disease but is hardly ever associated with other diseases is often considered diagnostic of that one disease. Medical textbooks mention not only the symptoms which are definitely diagnostic of the presence of a disease but also those which are strongly suggestive of the presence of disease.

Since many symptoms are associated with many different diseases and since so many symptoms are also associated with each disease, it is useful to provide a simple, rapid indexing system which will provide a doctor or a medical student with a list of diseases having different degrees of relevance to a pattern of symptoms that are present in a patient.

It is, therefore, an object of the present invention to provide an improved indexing system of simple, inexpensive construction which may be easily employed to indicate diseases having different degrees of relevance with respect to a selected group of symptoms.

Another object of the invention is to provide an improved peek-a-boo indexing system which weighs information sought according to its relevance to a combination of circumstances or conditions under consideration.

The invention, together with the foregoing and other objects thereof, can best be understood by reference to the following description of certain specific embodiments of the invention which are illustrated in the accompanying drawings wherein.

Figure 1:
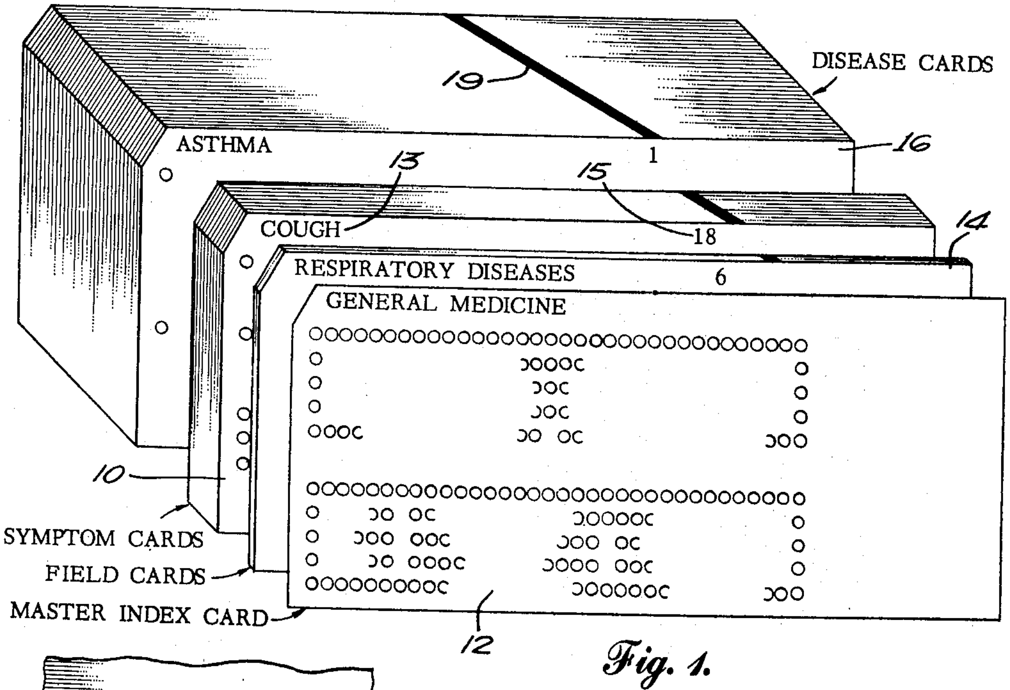
FIG. 1 is a perspective view of a complete deck or pack of medical index cards employing various features of this invention.

Referring to the drawings and particularly to FIGS. 1, 2, 3, 4, 6, 7 and 8, in which one embodiment of my invention is illustrated, it is to be noted that this embodiment of the invention makes use of a plurality of symptom cards 10 and a master index card 12, and a plurality of field cards 14, and two sub-decks of disease cards 16. All of the cards are perforated at locations corresponding to different kinds of information sought, and each of the individual cards bears printed designations of a factor associated with the perforations on the cards, as explained hereinafter.

Cards that indicate information according to the registration, that is superposition, of perforations are known in the art as Batten or peek-a-boo cards, at least when they are superposed for visual inspection to determine registration. A set of such index cards in which each index card represents a different term such as a symptom and in which each of the reference positions also represents a specific type of information such as a disease is known as a Batten or peek-a-boo deck.

Figure 6:
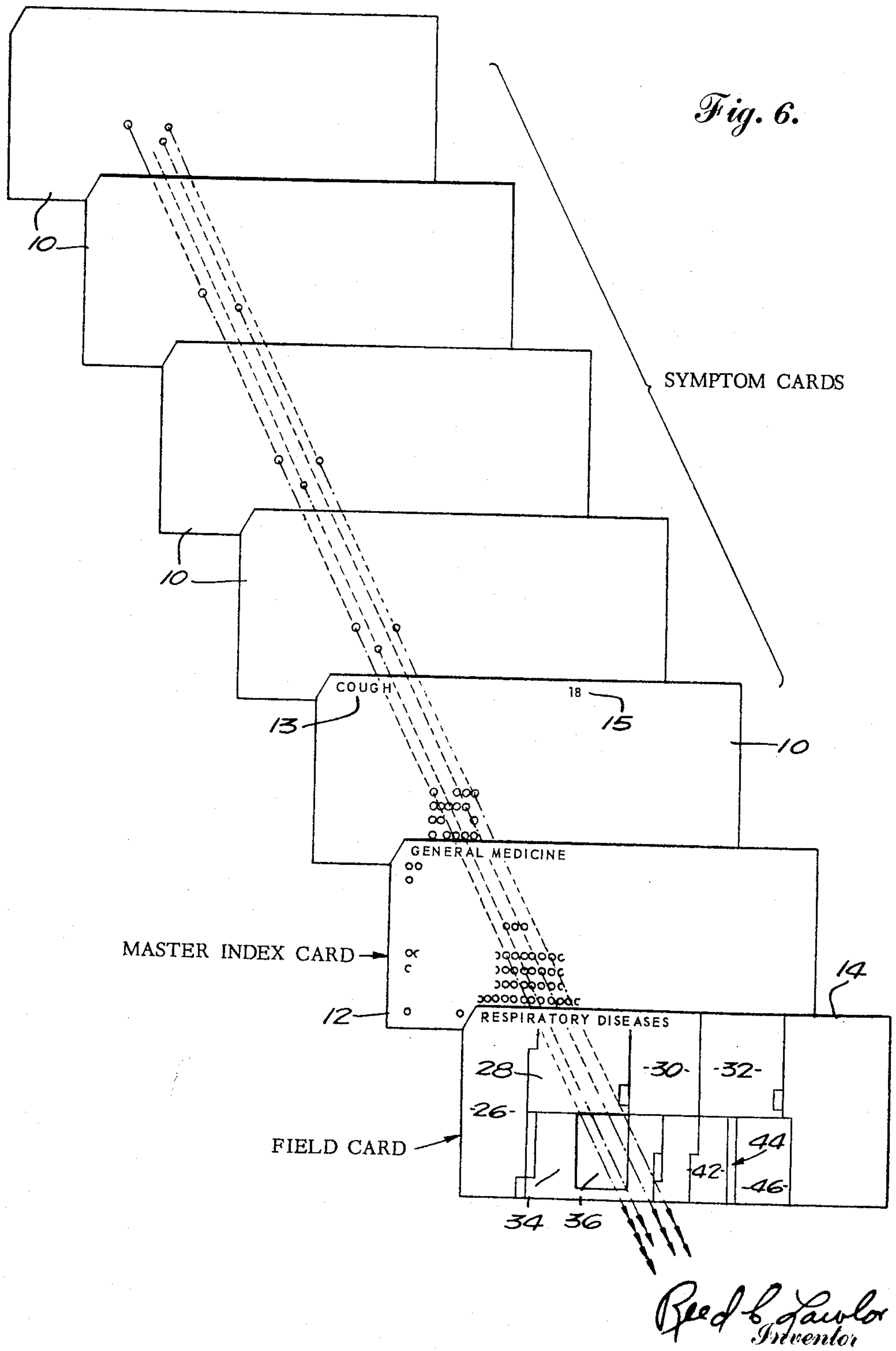
FIG. 6 is an exploded isometric view showing how a number of cards are stacked for use in accordance with one method of practicing present invention.

Initially, consideration is given herein to methods that use the symptom index cards 10, the field cards 14 and the master index card 12, as illustrated in FIG. 6. All of the symptom cards are semi-transparent so that when a master index card is placed upon a stack of selected symptom cards, either with or without a field card, a viewer looking through them can locate areas of different degrees of transparency depending upon how many of the symptom cards have perforations that are registered in the same location. The degree of transparency of such a stack of cards in various locations is an indication, in a way, of the relative degree of association of the diseases associated with the set of symptoms associated with the individual index cards that form the stack.

In the embodiment of the invention illustrated in FIGS. 1, 2, 3 and 4, the symptom cards 10 composed of parchment or plastic sheets that have visual light transparency, or transmission coefficient, T of between about 15% and about 60% for the reasons which will be explained hereinafter. A visual light transmission coefficient of about 20% to about 50% is very effective for the purpose of this invention, and a coefficient of about 30% is most effective for many purposes. In the best embodiment of the invention the cards are translucent. To prevent glare the surfaces of the cards are characterized by diffuse as distinguished from regular reflecting surfaces. The cards are flexible, of light weight, and thin, to facilitate manual handling. They are composed of material which easily receives and permanently retains printing. The cards may sometimes be of the type which are employed as punched cards in electronic data processing systems; however, cards that are used for that purpose generally have transmission coefficients of less than about 12% thus rendering them unsuitable for achieving all the objects of the present invention.

The cards are all of the same size and they are notched or otherwise cut along the edge such as by cutting off the corners in order to facilitate superposing the cards in a standard predetermined position. The cards may be about 3 inches in height to 7 inches long or wide, and about 0.010 inch thick.

Figure 2:
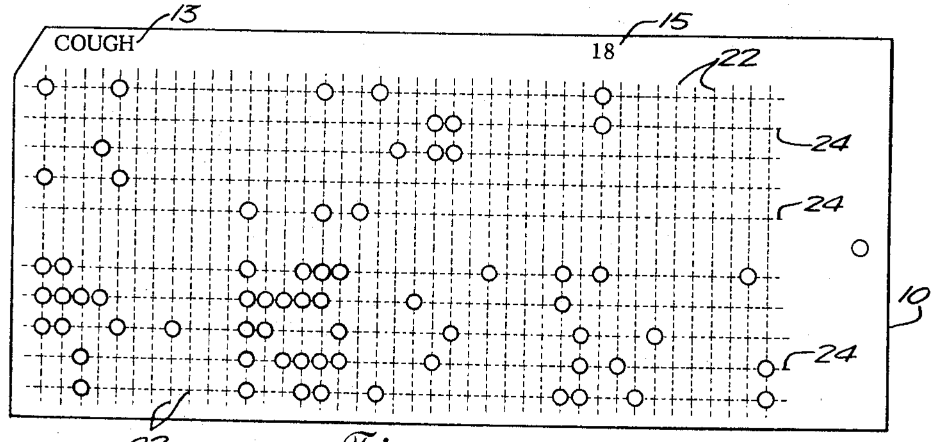
FIG. 2 is a plan view of a symptom card employed in this invention.
Figure 3:
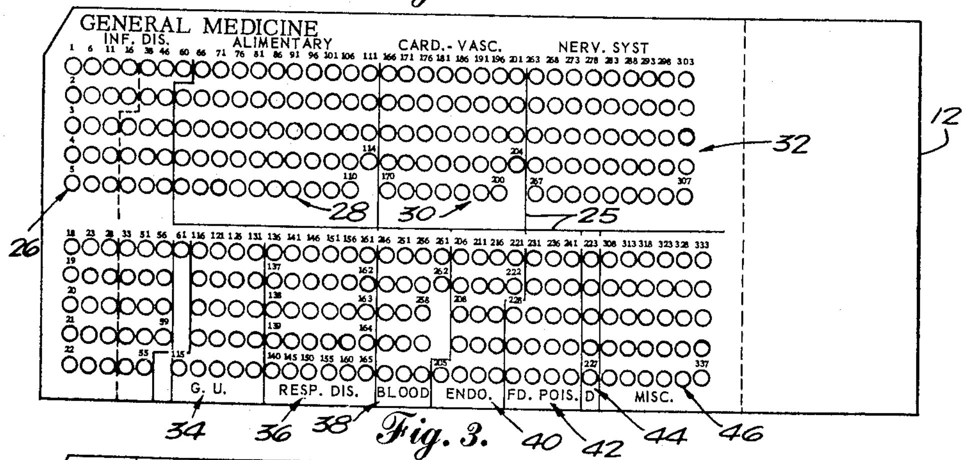
FIG. 3 is a plan view of a master disease index card used in this invention.

As indicated, for example, in FIGS. 2 and 3, the main body of each card 10 is divided into 45 columns indicated by the vertical dash lines 22 and ten rows indicated by the horizontal dash lines 24. The vertical lines 22 are evenly spaced across the lengths of the cards. The horizontal lines 24 are evenly spaced from each other and from the bottom edge but are spaced more from the top edge of the card to leave a space for printing on a symptom name 13 and a card number 15 on the card. The intersection of each vertical line 22 with each horizontal line 24 represents a location corresponding to a specific disease. Such indexing arrangements are known as coordinate indexing. The same location on all cards represents the same disease. The cards are divided into areas or fields such as areas 26, 28, 30, 32, 34, 36, 38, 40, 42, 44 and 46, corresponding to different groups of diseases. Some of these fields are divided into subfields. For example, the field 26 is divided into subfields **26*a*, 26*b*, 26*c*. In addition, a field 50** is employed for punching indexing information, such as the name of the disease or the number of the card, in machine-readable form.

Figure 9:
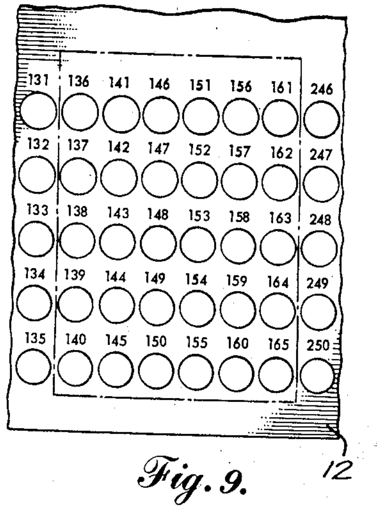
FIG. 9 is an enlarged fragmentary view of master index card.

As mentioned, each intersection of each vertical line with each horizontal line defines a disease location corresponding to a different disease. In the embodiment of the invention represented in FIGS. 1, 2, 3 and 4 and in FIG. 9, a number or other legend is placed adjacent each of these positions. Each number of other legend represents a different disease and therefore identifies a reference or address for the disease. The legend, however, may be the name of the disease.

Figure 11:
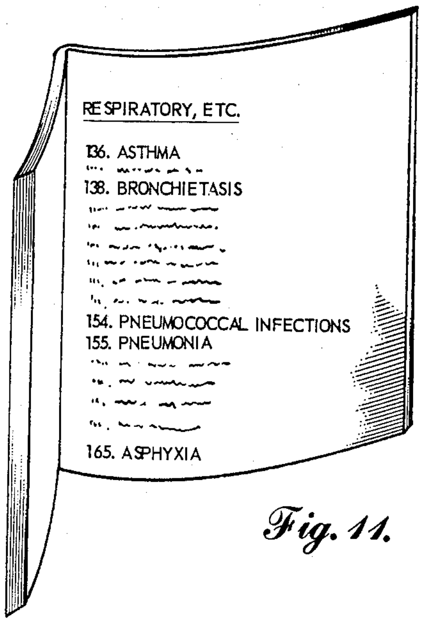
FIG. 11 is a perspective view of a pamphlet containing a list of the diseases indexed.

When the legends are not in the form of disease names, the disease themselves are listed with such addresses in a book, pamphlet, or the like. A portion of such a list is shown in FIG. 11. Such a list accompanies the deck of cards.

As shown there, the index numbers or addresses are listed in alphabetical order and the names of the diseases corresponding to the locations adjacent those addresses are written opposite the addresses. Thus, for example, the addresses No. 136–165 correspond to different respiratory diseases, as indicated in FIG. 11. Thus, for example, diseases asthma, bronchiectasis, . . . pneumococcal infection, pneumonia and asphyxia correspond to the index numbers 136, 138, . . . 154, 155, . . . and asphyxia, respectively.

It is not considered very practical to suggest that a card can have a position for each and every disease known to the medical profession nor is it very practical to consider that every known symptom will be represented by a card. However, as has been pointed out in the literature, there are approximately 80 common symptoms that are associated with approximately 300 common diseases which are of interest to the general practitioners. Very commonly in some specialties, it is also the case that a relatively small number of symptoms are associated with a relatively small number of diseases. For example, it is known that in the field of ophthalmology there are about 300 principal diseases of interest and about 200 principal symptoms. Similarly, in the field of childhood heart diseases, there are approximately 50 principal symptoms of interest and about 30 principal diseases of interest. With this invention various bodies of medical knowledge can be represented by peek-a-boo decks in such a way as to facilitate ready reference to the names of diseases commonly associated with particular sets of symptoms. This is accomplished by employing semi-transparent cards as parts of a peek-a-boo deck.

As in other peek-a-boo systems, in the system under consideration, perforations are formed at the reference locations that correspond to reference terms that are associated with the index terms. Whereas in other peek-a-boo systems, opaque, or substantially opaque cards are employed, in the present invention semi-transparent cards are employed and in addition, in many forms of the invention, an opaque card is provided that carries legends in the form of index numbers or other indicia for indicating the material being referenced.

In the present case, each of the symptom cards has a perforation in the location corresponding to each disease with respect to which the symptom in question is associated. For this reason, by merely glancing at a card bearing a particular symptom name, it can be ascertained whether the symptom is common, that is, one that is associated with many diseases, or whether the symptom is rare, that is, one that is associated with only a few diseases. Furthermore, by placing a field card over any individual symptom card, it can be readily ascertained whether the symptom occurs with many diseases in that field, or not. Likewise, by placing a master index card 12 over a particular symptom card, it may be readily ascertained with which fields it is not commonly associated.

The master index card 12 is provided with a perforation in a location corresponding to every disease that has been indexed, that is, to every disease to which reference may be made by the use of the peek-a-boo deck. As indicated in FIG. 3, a number is positioned directly above the perforation in each position. This number identifies the disease corresponding to the position directly beneath the number.

Usually it is desirable to select the locations of diseases that apply to any individual field of diagnosis together. In the master index card shown in FIG. 3 the boundaries of the various fields are shown. This card is provided with lines 25 that form the boundaries between the different fields. As indicated, field 26 represents infectious diseases; field 28 is employed to represent diseases of the alimentary system; field 30 is employed to represent the diseases of the cardiovascular system; field 32 is employed to represent diseases of the nervous system; field 34 is employed to represent diseases of the urino-genital system; field 36 is employed to represent diseases of the respiratory system; field 38 is employed to represent diseases of the blood; field 40 is employed to represent endocrine disorders; field 42 is employed to represent types of food poisoning; field 44 represents diet difficulties and field 46 represents miscellaneous diseases.

Some of the fields are divided into subfields. Thus, for example, field 26 which represents infectious diseases is divided into a subfield **26*a* which represents virus diseases, while subfield 26*b* represents bacterial diseases, etc. Subfield 26*c* represents miscellaneous infectious diseases not otherwise represented by individual locations in the infectious disease field 26**. Other fields are likewise divided into subfields, and a subfield is located in each field to represent miscellaneous diseases that are members of the field in question but are not assigned particular locations in the field.

It is to be noted that all of the symptom cards are numbered consecutively in alphabetical order and all of the disease cards are likewise numbered consecutively in alphabetical order thus facilitating rearranging them at any time in corresponding alphabetical order for ready reference. The cards of each subdeck are edge-notched at the edge of the index field or are otherwise marked along the edge as with a printed line 19 to facilitate separating the subdeck and arranging the cards of each subdeck in sequence by needling or other methods. In the simplest form the edge marking may be in the form of ink marks located along the top edge of the cards as shown in FIG. 1.

Figure 4:
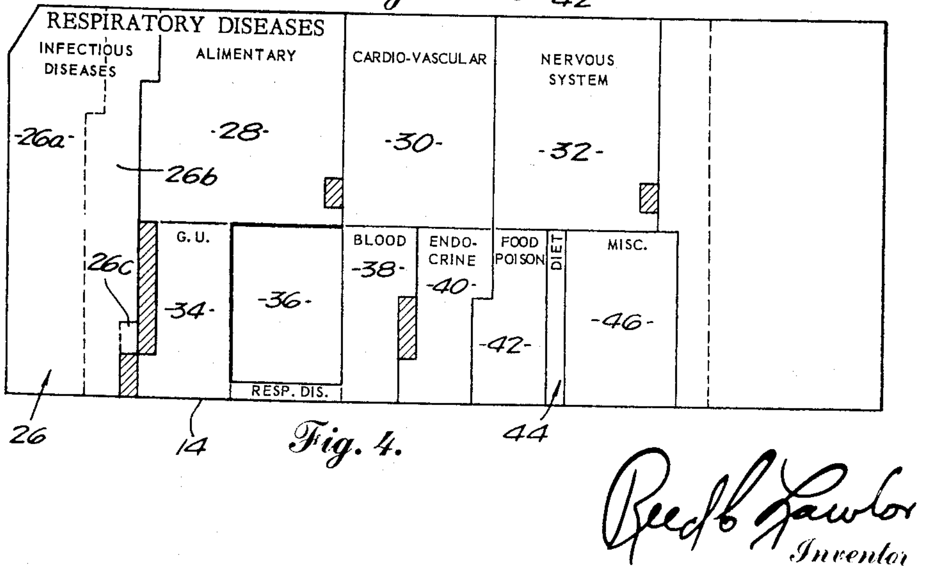
FIGS. 4 and 5 are plan views of field cards employed in this invention.
Figure 5:
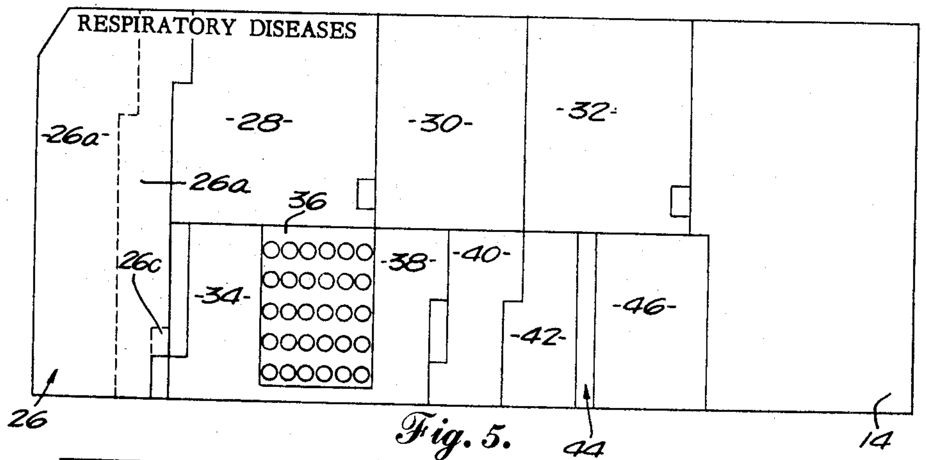

In addition, individual field cards are provided. Each of the individual field cards such as that represented in FIG. 4 has the entire area corresponding to the field in question cut out. Alternatively, the individual field card may be of the type represented in FIG. 5 in which a perforation is punched in every disease location in that field. While it is best for each field card to be clear and semi-transparent as are the individual symptom cards, the field cards may be opaque, especially if the field card of the type shown in FIG. 5 is to be employed and the master index card of FIG. 3 is not used. A colored transparent field card of the type shown in FIG. 4 is employed with a master index card of the type shown in FIG. 3 to help distinguish diseases within the field of interest from diseases outside the field of interest.

The peek-a-boo deck of this invention may be employed in many different ways. For example, if a doctor is interested in determining the relevance of a patient's symptoms to various diseases in a specific field of medicine, the symptom cards corresponding to the symptoms that a patient has, or which are otherwise the subject of study, are selected and are placed one upon another and beneath the master index card 12 and with an appropriate field card 14 as shown in FIG. 6. By viewing the cards in ordinary reading light or by holding the cards transverse to the line of sight between the observer and an electric light or other lighted area, the locations where varying numbers of perforations coincide may be ascertained and if desired tabulated. The diseases corresponding to those locations are identified in the index book of FIG. 11. The diseases are graded in accordance with the relative transparency of the stack of selected cards in the various locations.

In Table I there is shown a list of certain symptoms that are associated with the field of respiratory diseases and two other diseases, according to one authority. In this table, the numbers at the top represent symptoms and the numbers along the side represent diseases.

*Table I*

| | 4 | 17 | 19 | 28 | 33 | 40 | 46 | 76 | 82 | S |
|---|---|---|---|---|---|---|---|---|---|---|
| 42 | X | ------ | X | X | X | X | X | X | X | ---- |
| 136 | ------ | ------ | ------ | ------ | X | | | | | 1 |
| 137 | ------ | ------ | ------ | ------ | X | ------ | ------ | ------ | ------ | 1 |
| 138 | ------ | ------ | ------ | X | X | ------ | ------ | ------ | X | 3 |
| 139 | X | ------ | ------ | ------ | X | X | X | ------ | ------ | 4 |
| 140 | ------ | ------ | ------ | ------ | X | ------ | ------ | ------ | ------ | 1 |
| 141 | ------ | ------ | ------ | ------ | X | ------ | ------ | ------ | ------ | 1 |
| 142 | X | ------ | ------ | ------ | ------ | ------ | ------ | ------ | ------ | 1 |
| 143 | ------ | ------ | ------ | ------ | X | ------ | ------ | ------ | X | 2 |
| 144 | ------ | ------ | ------ | X | X | ------ | ------ | X | ------ | 3 |
| 145 | ------ | ------ | ------ | ------ | X | ------ | ------ | ------ | ------ | 1 |
| 146 | ------ | ------ | ------ | ------ | ------ | ------ | ------ | ------ | ------ | 0 |
| 147 | ------ | ------ | ------ | ------ | ------ | ------ | ------ | X | ------ | 1 |
| 148 | ------ | ------ | ------ | ------ | ------ | ------ | X | ------ | ------ | 1 |
| 149 | ------ | ------ | ------ | ------ | X | X | ------ | ------ | ------ | 2 |
| 150 | ------ | ------ | ------ | X | ------ | X | ------ | ------ | ------ | 2 |
| 151 | ------ | ------ | ------ | ------ | ------ | ------ | ------ | ------ | ------ | 0 |
| 152 | ------ | ------ | ------ | ------ | ------ | ------ | ------ | ------ | ------ | 0 |
| 153 | ------ | ------ | ------ | X | ------ | ------ | ------ | ------ | ------ | 1 |
| 154 | X | X | X | ------ | X | X | X | ------ | X | 7 |
| 155 | ------ | X | ------ | ------ | X | X | X | X | ------ | 5 |
| 156 | ------ | X | ------ | ------ | X | X | X | ------ | ------ | 4 |
| 157 | X | ------ | X | ------ | X | ------ | ------ | ------ | X | 4 |
| 158 | ------ | ------ | ------ | X | X | ------ | X | ------ | ------ | 3 |
| 159 | ------ | ------ | ------ | ------ | X | ------ | ------ | ------ | ------ | 1 |
| 160 | ------ | ------ | ------ | ------ | ------ | ------ | ------ | ------ | ------ | 0 |
| 161 | ------ | ------ | ------ | X | X | ------ | ------ | X | X | 4 |
| 162 | ------ | ------ | ------ | ------ | ------ | ------ | ------ | ------ | ------ | 0 |
| 163 | ------ | ------ | ------ | ------ | ------ | ------ | ------ | ------ | ------ | 0 |
| 164 | ------ | ------ | ------ | ------ | ------ | ------ | ------ | ------ | ------ | 0 |
| 165 | ------ | ------ | ------ | ------ | ------ | ------ | ------ | ------ | ------ | 0 |
| 326 | X | X | X | X | X | ------ | X | X | X | 8 |

In Table II the names of the symptoms represented in Table I are listed.

*Table II*

| | |
|---|---|
| 04 | anaemia |
| 17 | constipation |
| 19 | delirium |
| 28 | fainting |
| 33 | generalised cyanosis |
| 40 | hiccup |
| 46 | jaundice |
| 82 | vomiting |

In Table III, the names of the diseases represented in Table I are listed.

*Table III*

| | |
|---|---|
| 42 | Syphilis |
| *** | * * * |
| 136 | Asthma |
| 137 | Atelectasis and Massive Co. |
| 138 | Bronchiectasis |
| 139 | Bronchogenic carcinoma |
| 140 | Bronchopneumonia |
| 141 | Emphysema |
| 142 | Empyema |
| 143 | Fibroid lung |
| 144 | Glottis, edema of |
| 145 | Laryngeal stridor |
| 146 | Laryngeal paralysis |
| 147 | Laryngeal tumors |
| 148 | Mammary carcinoma |
| 149 | Mediastinal N.G. on infl. |
| 150 | Pleurisy Tb. or non Tb. |
| 151 | Pleural effusion |
| 152 | Pneumoconiosis |
| 153 | Pneumothorax |
| 154 | Pneumococcal infs., inc. pneumonia |
| 155 | Pneumonia prim. atypic |
| 156 | Pneumonias, other |
| 157 | Pulmon. abscess |
| 158 | Pulm. embolism |
| 159 | Pulm. edema ac. |
| 160 | Pulm. cysts |
| 161 | Respiratory obstruc. eg. F.B. |
| 162 | Slipping rib |
| 163 | Tracheobronchitis |
| 164 | Other respiratory dis. |
| 165 | Asphyxia |
| *** | * * * |
| 326 | Poison |

In a particular case, if all of the symptoms of Table I are present in a particular patient's current history and it is suspected for various reasons that a respiratory or similar infection is involved, the numbers in the right-hand column provide a rough grading of the diseases in terms of those symptoms. This rough grading can be readily obtained by mere visual inspection of the symptom cards in order to ascertain the relative transparency of the symptom cards in the locations corresponding to the various diseases. Here it will be noted that of the nine symptoms present, seven are associated with pneumococcal infections, five are associated with pneumonia prim. atypic, four are associated with other pneumonias, pulmonary abscess, plumonary embolism, respiratory obstructions and bronchogenic carcinoma, while three of them are associated with the other diseases, and two of them are associated with two other diseases and one with ten other diseases, and none of them with the remaining diseases. If other fields are considered, it is quickly found that eight of the symptoms are associated with 42 and also with 326.

The number of cards that do not block the passage of light in a disease location may be taken as the grade of the disease corresponding to that location. By employing cards that have a visual transmission coefficient T of between about 15% to about 60% it is very easy to see through two, three, four, five or even six or seven cards, the upper limit depending on the transmission coefficient, so that the grading of the various diseases over quite a wide range is possible. On the other hand, if the transparency of a card is only about 12% or less, it is very difficult to see through more than two cards in ordinary light. Thus, with a stack of N ordinary punched cards, diseases of grades N and N–1 could be distinguished and diseases of grade N–2 barely recognized, but in the best form of this invention diseases with grades up to N–4, N–5 or N–6, may be easily recognized. Thus, in the particular case represented by Table I, with cards of such low transmission coefficient of about 10%, it would barely be possible to determine by inspection of the stack of selected cards that disease 154 is associated with the symptoms present and it would not be possible to tell that disease 155 and diseases 139, 156, 157 and 161 have a fairly high degree of association with the symptoms in question and it would be impossible to identify diseases of lower grades without cumbersome manipulation of the cards. But by employing this invention in which the transmission coefficient of the symptom cards is about 20%, all of these diseases could be identified as being associated in varying degrees with the group of symptoms present. And by employing cards having a transmission coefficient of about 50%, diseases having even a lower degree of association, such as diseases 138, 144, 158 can be identified.

It is convenient in evaluating the diseases to grade them by the number of symptoms of the patient's symptom pattern that are associated therewith. This number is the same as the number of cards having registered perforations therein.

It is not claimed that the inspection of a stack of selected symptom cards will result in a diagnosis of a patient's ills. It is only claimed that if the diseases have been properly indexed in terms of the symptoms and the cards properly prepared, inspection of the cards can aid a medical doctor or medical student in focusing his attention on diseases of interest.

In the example given above, attention has been directed only to a selected field of diseases. In some cases it may be desirable to consider all diseases in the index. In this case no individual field card is employed. However, even in such a case, it is desirable to employ a master index card marked with field boundaries, as illustrated in FIG. 3, as an aid in identifying the fields in which diseases of different grades appear as determined by the transparency of the selected symptom cards in the various disease locations.

Figure 10:
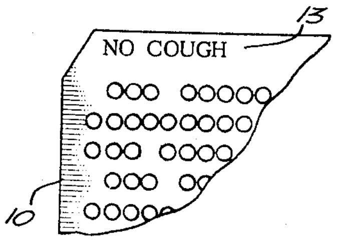
FIG. 10 is a fragmentary view of a portion of a card complementary to that shown in FIG. 2.

It is frequently just as important to know what symptoms are absent from a patient as those that are present. To take advantage of information regarding symptoms that are absent, complementary symptom cards may be employed. A fragment of a complementary symptom card representing the absence of a cough is shown in FIG. 10. In this case it will be noted that the symptom is described as "no cough." Here will be noted, a hole is located at each position on the card corresponding to a disease for which no hole is located on the main symptom card of FIG. 2. But for each disease for which a hole is located on the main symptom card of FIG. 2, there is a blank space in the corresponding position of FIG. 10.

*TABLE IV*

| | 4 | 17 | 19 | 28 | 33 | 40 | 46 | 76 | 82 | S |
|---|---|---|---|---|---|---|---|---|---|---|
| | P | A | A | A | P | P | P | P | A | |
| 42 | X | X | | | X | X | X | X | | 6 |
| 136 | | X | X | X | X | | | | X | 5 |
| 137 | | X | X | X | X | | | | X | 5 |
| 138 | | X | X | | X | | | | | 3 |
| 139 | X | X | X | X | X | X | | | X | 7 |
| 140 | | X | X | X | X | | | | X | 5 |
| 141 | | X | X | X | X | | | | X | 5 |
| 142 | X | X | X | X | | | | | X | 5 |
| 143 | | X | X | X | X | | | | | 4 |
| 144 | | X | X | | X | | X | X | X | 6 |
| 145 | | X | X | X | X | | | | X | 5 |
| 146 | | X | X | X | | | | | X | 4 |
| 147 | | X | X | X | | | X | X | X | 6 |
| 148 | | X | X | X | | X | | | X | 5 |
| 149 | | X | X | X | X | | | | X | 5 |
| 150 | | X | X | | | | | | X | 3 |
| 151 | | X | X | X | | | | | X | 4 |
| 152 | | X | X | X | | | | | X | 4 |
| 153 | | X | X | | | | | | X | 3 |
| 154 | X | | | X | X | X | | | | 4 |
| 155 | | | X | X | X | X | X | X | X | 7 |
| 156 | | | X | X | X | X | | | X | 5 |
| 157 | X | X | | X | X | | | | | 4 |
| 158 | | X | X | | X | X | | | X | 5 |
| 159 | | X | X | X | X | | | | X | 5 |
| 160 | | X | X | X | | | | | X | 4 |
| 161 | | X | X | | | | X | X | | 4 |
| 162 | | X | X | X | X | | | | X | 5 |
| 163 | | X | X | X | | | | | X | 4 |
| 164 | | X | X | X | | | | | X | 4 |
| 165 | | X | X | X | | | | | X | 4 |
| 326 | X | | | | X | | X | X | | 4 |

An example of an analysis made by employing both the main symptom cards and the complementary cards is illustrated in Table IV. In this table, as in Table I, the numbers at the top of the table represent symptoms identified in Table II, and the numbers in the left-hand column represent the diseases identified in Table III. Assume that the symptoms of constipation, delirium, fainting, and vomiting are absent, but that the symptoms of anemia, generalized cyanosis, hiccup, sore throat, and jaundice are present. In this case the letter "P" or the letter "A" is placed beneath the number of the symptom in Table IV to indicate whether the symptom is present or whether it is absent. In those cases where the symptom is present X's are located in the table in the same place where they are found in Table I, but in the cases where the symptoms are absent, X's are located in the table only where they are absent from Table I. In this case the main cards corresponding to the symptoms that are present, and the complementary cards corresponding to the symptoms that are absent, are stacked up for inspection in accordance with the general arrangement, as illustrated in FIG. 6. In this case the number of cards on which perforations are aligned in the various positions corresponding to the respective diseases are indicated in the column headed by the letter "S" to the right of Table IV. This is the number of perforations that coincide in the positions corresponding to the respective diseases in the left-hand column. Here it will be noted that seven of the symptoms are associated with bronchiogenic carcinoma and with pneumonia prim. atypic while six of the symptoms are associated with syphilis, with edema of the glottis and with laryngeal tumors. It is thus seen that semi-transparent cards are useful in determining the number of symptoms associated with various diseases in a field of interest.

Experimentally, it is found that the number ($n$) of cards through which a person can just barely see when facing a light field of about 125 foot candles is given by the equation $$T^n = 0.0025 \text{ approx.}$$

where:

T=transmission coefficient of a single card

But the number of cards through which a person can see with ease is less than $n$ More particularly, it is found that by employing cards having a transmission coefficient of about 15% or more, it is possible to see through at least three or four cards easily and by employing cards having a transmission coefficient up to about 60%, it is possible to recognize positions at which perforations coincide up to about eleven.

If cards of maximum transparency of about 90% are employed, analysis may be made when a much larger number of symptoms are under consideration but with such cards it is not easy to differentiate between the number of holes that coincide at two different positions if the total number of registered holes at the two positions differ by only about 3 or 4. Even when employing cards having transmission coefficients greater than about 50%, it is difficult to differentiate between the number of coinciding perforations if they differ by only one.

By employing cards having a transmission coefficient of between about 20% to about 50%, it is possible to see through five or six cards very easily and at the same time to ascertain the relative number of cards which have coinciding holes at various positions. Thus, analysis may easily be made with such cards when more than about seven symptoms are under consideration. To achieve maximum transparency consistent with easy discrimination between members of coinciding holes, that is, easy differentiation of the grades of the diseases, a transmission coefficient of about 30% is best.

In an alternative form of the invention, no master disease index card is employed. Instead, the legends identifying the diseases are printed on the symptom cards, adjacent the disease locations. In this case the diseases are identified by reading the legends on the top card of a stack.

Figure 7:
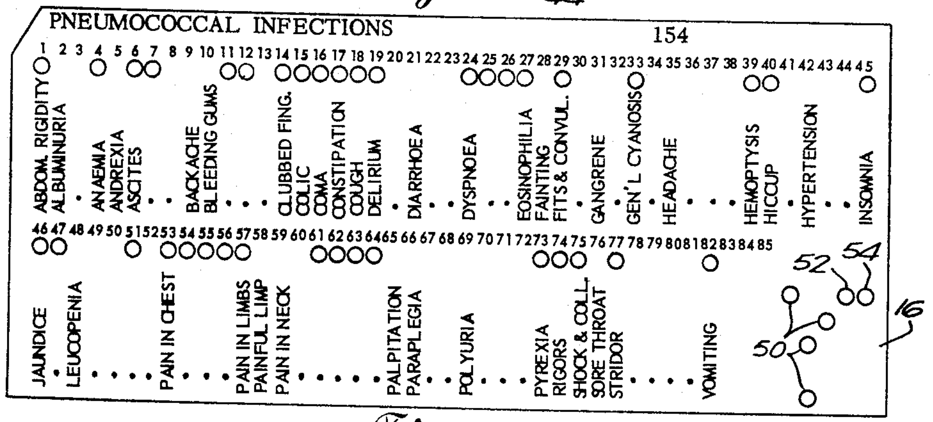
FIGS. 7 and 8 are plan views of a pair of disease cards employed in one form of this invention.

As a further aid in diagnosis, a deck of disease cards may be employed. In such a deck, one index card is employed for each disease and the different locations at which perforations may be placed on the cards correspond to different symptoms, as shown in FIG. 7. In such a deck a perforation is placed on each card at each location corresponding to each symptom commonly associated with the disease designated on that card. Such an arrangement may be employed in differential diagnosis. By way of example, if a doctor suspects that a patient has one of several diseases, the cards corresponding to those diseases are selected from the disease deck and placed one upon another. They are then inspected to identify symptoms that are associated with some diseases but not with others. For instance, if there are perforations on all cards corresponding to symptom "A" but only on some cards for symptom "B," it is probably better for the doctor to make tests for symptom "B" than for symptom "A" to help narrow the number of diseases that must be considered by the doctor in arriving at a final diagnosis. The same applies to other symptoms. In all cases, attempts are made to identify symptoms that divide the diseases into groups that can be differentiated.

Figure 8:
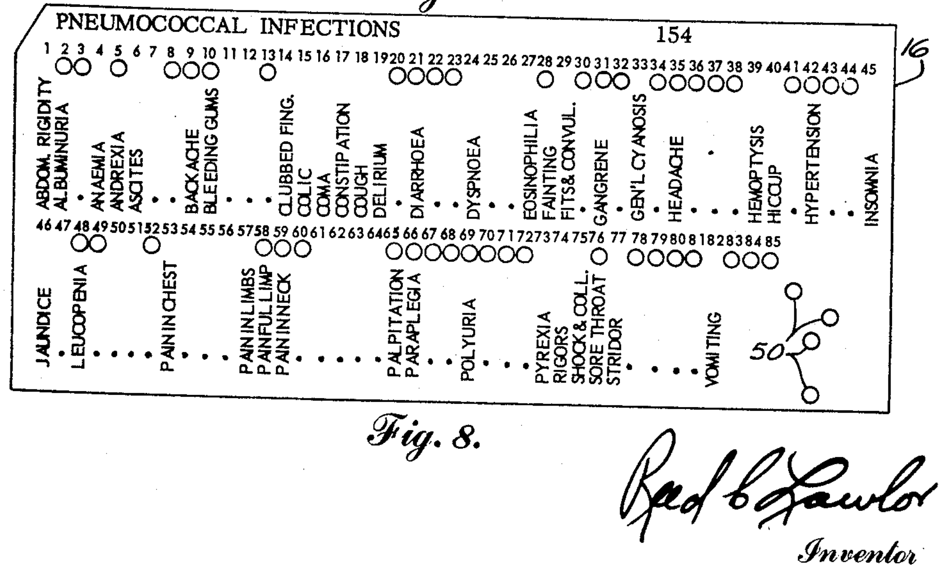

However, it is best to record complementary data on the cards of a disease deck as indicated in FIG. 8. Such data is to be distinguished from the main data recorded on the cards like FIG. 7. Thus, in cards having complementary data, each disease card is perforated at all locations except those which correspond to symptoms that are associated with the respective diseases. By stacking a selected group of disease cards which represent diseases which are to be considered in connection with a particular patient's problem and by inspecting these cards visually, the transparency of the selected cards at different locations can be determined in order to grade the various symptoms. With such an arrangement wherever the deck of cards is perfectly transparent, that is where perforations coincide on all of the cards, the symptom is not associated with any of the diseases represented by the selected cards. Where only a few cards are unperforated while the remaining cards are perforated, there is an indication that the symptom in question is associated with only a few of the diseases. And where more of the cards are unperforated except three or four, there is an indication that the corresponding symptoms are associated with a still larger number of the diseases but not the rest. Thus, where a large number of diseases are considered in this fashion, the relative transparency of the cards at any position where a stack of cards are not all perforated provide at least a rough indication of the importance for considering the corresponding symptoms.

The area in the lower right-hand portion of the disease cards is reserved for recording perforations 50 for serializing the disease cards, perforations 52 to distinguish cards of the main disease deck from cards of the complementary disease deck, and perforations 54 to distinguish disease cards from other cards such as symptom card of the deck. If desired all the cards of the deck of FIG. 1 can be numbered serially with a different number and perforated in a corresponding manner to facilitate rearranging the entire deck in a predetermined order.

Since in this particular instance, a body of only 80 symptoms was under consideration, room remains on the card of FIGS. 7 and 8 for the printing of the names of the symptoms. Accordingly, it is to be noted that the names of the symptoms that are associated with the disease in question are printed opposite the area where no perforations are located.

By providing two decks—one being a symptom deck and the other being a disease deck as described above, the two decks may be employed together to help a medical student or doctor ascertain what diseases should be considered in the light of known symptoms and then what further symptoms might best be investigated next in order to differentiate between the diseases and to therefore narrow the diagnosis.

While the invention has been described herein with reference to an application to medical information, it will be understood that the invention may also be applied to indexing of other information. For example, each of the index cards of a positive property deck (like a symptom deck), may be employed to represent a property of a material and each of the locations on the cards may correspond to a different material or other item. With such an arrangement, a group of index cards may be employed with a master index card to identify materials having different proportions of a set of properties that it is hoped to find in a single material. Likewise, decks of negative property cards may be employed in which each card is perforated only in positions corresponding to items that do not have the property. The cards of the positive and negative property decks are employed as the cards of the positive and negative disease decks in connection with FIG. 4. In this case an inverse deck may also be employed in which each of the cards represents a different item and various properties associated with the respective items correspond to different coordinate locations on the cards. In this case, once a set of items has been selected that have a large number of the properties sought in a material, the item cards may then be employed to help with selection of items that have other desired properties.

The invention may also be employed for indexing other kinds of information where it is desirable to determine the relative proportion of the indexing information found in various references indexed. It is thus to be understood that the invention is not limited to its application to medical information though the field of medicine represents the most important field of application now known.

In order to facilitate the use of the peek-a-boo deck of this invention, different subdecks are differently colored or otherwise differently coded. For example, the positive symptom cards may be white, the negative symptom cards may be pink. The individual field cards may be light green. The master index card may be dark green. The cards of the positive disease deck may be light blue and the cards of the negative disease deck may be light yellow. By making the cards of the two disease decks of complementary colors and selecting cards for different diseases from the two decks, additional information may be obtained to facilitate differential diagnosis. Thus, where such cards are superposed, the perforation position that is bright and most yellow corresponds to symptoms that are most distinctive of only a few diseases corresponding to the yellow cards while the perforations that are bright and most blue correspond to symptoms that are most distinctive of only a few diseases corresponding to the blue cards.

No claim is here made that the data described to exemplify the invention would be considered correct by a doctor or that the problems selected would actually be encountered by a doctor in his practice or by a medical student in his studies. Nevertheless, the examples do illustrate the method for using the invention sufficiently well to enable a doctor or medical student to practice the invention.

In this application the term symptom is not used in its strict sense of indicating an anomalous condition but is intended to include the term sign and even the absence of an anomalous condition. Thus the term symptom, unless otherwise limited, indicates a condition in which a symptom is present or else a condition in which a symptom is absent. On the other hand, the term disease refers only to diseases that are present.

As has been pointed out, it is not claimed that this invention will perform diagnoses. However, it can be used to aid a doctor who is making a diagnosis select those diseases which need to be studied further. It may thus aid him in referring to text books that discuss the diseases or symptoms to which he is referred by the use of thet peek-a-boo decks of this invention. In a way therefore this invention should be considered primarily as an index of medical literature and should be considered a diagnostic tool only in the sense that it helps a doctor in his reference to the literature by aiding him in selecting diseases which are closely associated with the group of symptoms known to be present or known to be absent in a patient's condition.

It will be appreciated by those skilled in the art that many variations may be made in the invention without departing from the underlying principles. It is therefore to be understood that the invention is not limited to the specific forms described but includes other forms within the scope of the appended claims.

I claim:

1. In a system for indexing medical information, the combination of a first deck comprising a plurality of symptom cards, and a second deck comprising a plurality of medical field cards, and a master index card, all of said cards being of the same size and shape whereby selected groups of cards may be stacked in a uniform manner, all of said symptom cards being semi-transparent, a plurality of identical coordinate locations on the respective cards being superposable when selected cards are so stacked, each of said coordinate locations corresponding to a different disease, said master index card being perforated at each disease location, a legend located adjacent each of said coordinate locations on said index card for identifying the disease associated with said each location, each of said symptom cards being perforated at each coordinate position thereupon corresponding to each disease with respect to which the symptom represented by that card is associated, each of said symptom cards being perforated in a different pattern of coordinate positions than each of the other symptom cards, but some of such symptom cards being perforated in the same positions, each symptom card bearing a legend identifying the symptom associated with diseases represented by data recorded on that card, each of said field cards being transparent at a plurality of adjacent coordinate positions corresponding to diseases in a group characteristic of a specific field of medicine, different field cards being transparent in different locations in different areas of the respective field cards.

2. A system for indexing medical information as defined in claim 1 in which the semitransparent medical field cards and the semitransparent symptom cards are of different colors.

3. In a system for indexing medical information, the combination of a deck comprising a large number of symptom cards, and a master index card, all of said cards being of the same size and shape whereby selected groups of cards may be stacked in a uniform manner, all of said symptom cards being so semitransparent, that a person can easily see through at least two cards in room light of ordinary reading intensity, a plurality of identical coordinate locations on the respective cards being superposable when selected cards are so stacked, each of said coordinate locations corresponding to a different disease, said master index card being perforated at each disease location, a legend located adjacent each of said coordinate locations on said master index card for identifying the disease associated with said each locations, each of said symptom cards being perforated at each coordinate position thereon corresponding to each disease with respect to which the symptom represented by that card is associated, each of said symptom cards being perforated in a different pattern of coordinate positions than each of the other symptom cards, but some of such symptom cards being perforated in the same positions, each symptom card bearing a legend identifying the symptom associated with diseases represented by data recorded on that card.

4. A system for indexing medical information as specified in claim 3 wherein said master index card is opaque.

5. A system for indexing medical information as in claim 1 wherein the light transmission coefficient of each symptom card is between about 15% and about 60%, whereby the proportions of different symptoms in a selected set of symptoms that are associated with various diseases may be ascertained by comparison of the relative degrees of transparency at various coordinate positions of a group of cards corresponding to said set of symptoms.

6. A system for indexing medical information as in claim 1 wherein the light transmission coefficeint of each index card is between about 20% and about 50%, whereby the proportions of different symptoms in a selected set of symptoms that are associated with various diseases may be ascertained by comparison of the relative degrees of transparency at various coordinate positions of a group of cards corresponding to said set of symptoms.

7. A system for indexing medical information as in claim 1 wherein the light transmission coefficient of each index card is about 30%, whereby the proportions of different symptoms in a selected set of symptoms that are associated with various diseases may be ascertained by comparison of the relative degrees of transparency at various coordinate positions of a group of cards corresponding to said set of symptoms.

8. In a system for indexing information, the combination of a deck comprising a large number of property cards, and a reference card, all of said cards being of the same size and shape whereby selected groups of cards may be stacked in a uniform manner, all of said property cards being so semitransparent, that a person can easily see through at least two cards in room light of ordinary reading intensity, a plurality of identical coordinate locations on the respective cards being superposable when selected cards are so stacked, each of said coordinate locations corresponding to a different item, said reference card being perforated at each item location, an item identifier being located adjacent each of said coordinate locations on said reference card, each of said property cards being perforated at each coordinate position thereon corresponding to each property with respect to which the symptom represented by that card is associated, each of said property cards being perforated in a different pattern of coordinate positions than each of the other property cards, but some of the property cards being perforated in the same positions, each property card bearing a legend identifying the properties corresponding to items represented by data recorded by perforations on that card.

9. In a system for indexing information, the combination of a deck comprising a plurality of positive property cards, and a deck comprising a plurality of negative property cards, all of said cards being of the same size and shape whereby selected groups of cards may be stacked in a uniform manner, all of said property cards being so semitransparent, that a person can easily see through at least two cards in room light of ordinary reading intensity, identical coordinate locations on the respective cards being superposable when selected cards are so stacked, each of said coordinate locations corresponding to a different item, each of said positive property cards being perforated only at each coordinate position thereon corresponding to each item with respect to which the property represented by that card is associated, each of said positive property cards being perforated in a different pattern of coordinate positions than each of the other positive property cards, but some of the positive property cards being perforated in the same positions, each of said negative property cards being perforated only at each coordinate position thereon corresponding to each item with respect to which the property represented by that card is not associated, each of said negative property cards being perforated in a different pattern of coordinate positions than each of the other negative property cards, but some of the negative property cards being perforated in the same positions, each property card bearing a legend identifying the property associated with items represented by data recorded on that card.

10. A system for indexing information as specified in claim 9 including a master index card of the same size and shape as said property cards, said master index card being perforated at coordinate locations thereon identical with those on the property cards, said index card having a legend located adjacent each of said coordinate locations for identifying the item corresponding to said location.

11. A system for indexing information as in claim 9 wherein the light transmission coefficient of each property card is between about 15% and about 60%, whereby the proportions of different properties associated with various items may be ascertained by comparison of the relative degrees of transparency of a selected group of cards corresponding to a set of properties at various coordinate positions.

12. In a system for indexing information, the combination of a deck comprising a plurality of property cards, all of said cards being the same size and shape whereby selected groups of cards may be stacked in a uniform manner, all of said cards having a transmission coefficient about 20% or more, identical coordinate locations on the respective cards being superposable when selected cards are so stacked, each of said coordinate locations corresponding to a different item, each of said property cards being perforated at each coordinate position thereon corresponding to each item with respect to which the property represented by that card is associated, each of said property cards being perforated in a different pattern of coordinate positions than each of the other property cards, but some of the property cards being perforated in the same positions, each property card bearing a legend identifying the property associated with items represented by data presented by perforations in that card.

13. A system for indexing information as in claim 12 wherein the light transmission coefficient of each index card is between about 20% and about 50%.

14. In a system for indexing medical information, the combination of two decks each comprising a plurality of symptom cards, all of said symptom cards being of the same size and shape whereby selected groups of symptom cards may be stacked in a uniform manner, all of said cards being so semitransparent, that a person can easily see through at least two cards in room light of ordinary reading intensity, a plurality of identical coordinate locations on the respective symptom cards being superposable when selected cards are so stacked, each of said symptom cards of the first deck being perforated at each coordinate position thereon corresponding to each disease with respect to which the symptom identified on that card is associated when when symptom is present, each of said property cards of said first deck being perforated in a different pattern of coordinate positions that each of the other property cards of said first deck, but some of the property cards of the first deck being perforated in the same positions, each of said symptom cards of the second deck being perforated at each coordinate position thereon that does not correspond to any disease with respect to which the symptom identified on that card is associated, each of said property cards being of said second deck being perforated in a different pattern of coordinate positions than each of the other property cards of said second deck, but some of the property cards of said second deck being perforated in the same positions, the cards of the two decks occurring in pairs, each pair corresponding with a different symptom, each card of each pair that is a member of the first deck bearing a legend to indicate that the corresponding symptom is present, each card of each pair that is a member of the other deck bearing a legend to indicate that the corresponding symptom is absent, means for identifying the disease corresponding to each of the respective perforations on each of said cards, whereby the proportions of different symptom indications associated with various diseases may be ascertained by comparison of the relative degrees of transparency at various coordinate positions of a group of cards corresponding to a selected set of symptom indications.

15. A system for indexing medical information as in claim 14 wherein the light transmission coefficient of each symptom card is between about 15% and about 60%.

16. A system for indexing medical information as in claim 14 wherein the light transmission coefficient of each index card is between about 20% and about 50%.

17. A system for indexing medical information as defined in claim 14 in which the semitransparent cards of one deck are of a different color from that of the semitransparent cards of the other deck.

References Cited by the Examiner

UNITED STATES PATENTS

| | | | |
|---|---|---|---|
| 1,526,717 | 2/25 | Nunez | 35—17 |
| 1,988,634 | 1/35 | Stonecypher | 35—17 |
| 2,248,162 | 7/41 | De Araujo | 35—17 |

OTHER REFERENCES

"Product Engineering," pages 48 and 49, Jan. 16, 1961.

References Cited by the Applicant

UNITED STATES PATENTS

| | | |
|---|---|---|
| 1,165,465 | 12/15 | Taylor. |
| 2,157,036 | 5/39 | Torkelson. |
| 2,337,594 | 12/43 | Easley. |
| 2,498,854 | 2/50 | Hazel. |
| 2,645,152 | 7/53 | Martin. |
| 2,693,646 | 11/54 | Hawkins. |
| 2,857,687 | 10/58 | Erdman. |
| 2,859,541 | 11/58 | Parmenter. |
| 3,052,150 | 9/62 | Jonker. |

JEROME SCHNALL, *Primary Examiner.*

A. BERLIN, *Examiner.*